United States Patent
Zhou

(10) Patent No.: US 10,037,461 B2
(45) Date of Patent: Jul. 31, 2018

(54) BIOMETRIC AUTHENTICATION, AND NEAR-EYE WEARABLE DEVICE

(71) Applicant: Beijing Zhigu Rui Tuo Tech Co., Ltd, Beijing (CN)

(72) Inventor: Liang Zhou, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 0 days.

(21) Appl. No.: 15/316,509

(22) PCT Filed: Apr. 30, 2015

(86) PCT No.: PCT/CN2015/077958
§ 371 (c)(1),
(2) Date: Dec. 5, 2016

(87) PCT Pub. No.: WO2015/184942
PCT Pub. Date: Dec. 10, 2015

(65) Prior Publication Data
US 2017/0140222 A1    May 18, 2017

(30) Foreign Application Priority Data

Jun. 6, 2014 (CN) .......................... 2014 1 0251323

(51) Int. Cl.
*G06K 9/00* (2006.01)
*G06F 21/32* (2013.01)
(Continued)

(52) U.S. Cl.
CPC ......... *G06K 9/00604* (2013.01); *G06F 3/013* (2013.01); *G06F 21/32* (2013.01);
(Continued)

(58) Field of Classification Search
CPC ........... G06K 9/00604; G06K 9/00335; G06K 9/0061; G06K 9/00617
See application file for complete search history.

(56) References Cited

U.S. PATENT DOCUMENTS 8,462,995 B2    6/2013  Fujii et al.
8,571,851 B1    10/2013 Tickner et al.
(Continued)

FOREIGN PATENT DOCUMENTS

CN    102037488 A    4/2011
CN    103376896 A    10/2013
(Continued)

OTHER PUBLICATIONS

International Search Report for PCT Application No. PCT/CN2015/077958, dated Jul. 31, 2015, 4 pages.

*Primary Examiner* — Ruiping Li
(74) *Attorney, Agent, or Firm* — Amin, Turocy & Watson, LLP

(57) ABSTRACT

Biometric authentication can comprise: obtaining, in response to an access request, verification information for biometric authentication and a piece of depth information corresponding to a presentation depth of the verification information; presenting the verification information at the presentation depth according to the piece of depth information; acquiring gaze point depth information of an eye of a user during presentation of the verification information; and analyzing whether the gaze point depth information is consistent with the piece of depth information, to determine whether the biometric authentication succeeds. Also, verification information for biometric authentication can be presented at a depth corresponding to the verification information, and whether the biometric authentication succeeds can be determined by determining whether a gaze point depth of an eye of a user during presentation of the verification information is consistent with the depth, thereby improving accuracy of authentication and security of object access.

53 Claims, 10 Drawing Sheets

(51) Int. Cl.
*G06F 3/01* (2006.01)
*G06T 7/50* (2017.01)
*H04N 5/225* (2006.01)

(52) U.S. Cl.
CPC ....... *G06K 9/0061* (2013.01); *G06K 9/00335* (2013.01); *G06K 9/00617* (2013.01); *G06T 7/50* (2017.01); *H04N 5/2252* (2013.01)

(56) References Cited

U.S. PATENT DOCUMENTS

| | | |
|---|---|---|
| 8,594,374 B1 | 11/2013 | Bozarth |
| 9,104,854 B2 | 8/2015 | Xiao et al. |
| 2012/0140993 A1 | 6/2012 | Bruso et al. |
| 2012/0291122 A1 | 11/2012 | Chow |
| 2013/0044055 A1 | 2/2013 | Karmarkar et al. |
| 2013/0275309 A1 | 10/2013 | Kwong |
| 2014/0126782 A1 | 5/2014 | Takai et al. |
| 2014/0225820 A1* | 8/2014 | Schwesinger ........... G06F 3/011 345/156 |
| 2015/0193107 A1* | 7/2015 | Schwesinger ......... G06F 3/0485 715/784 |

FOREIGN PATENT DOCUMENTS

| | | |
|---|---|---|
| CN | 103455746 A | 12/2013 |
| CN | 103745142 A | 4/2014 |
| CN | 103748593 A | 4/2014 |
| CN | 103761653 A | 4/2014 |
| CN | 104036169 A | 9/2014 |
| WO | 2012107879 A2 | 8/2012 |

\* cited by examiner

BIOMETRIC AUTHENTICATION, AND NEAR-EYE WEARABLE DEVICE

RELATED APPLICATION

The present application is a U.S. National Stage filing under 35 U.S.C. § 371 of international patent cooperation treaty (PCT) application No. PCT/CN2015/077958, filed Apr. 30, 2015, and entitled "BIOMETRIC AUTHENTICATION, AND NEAR-EYE WEARABLE DEVICE", which claims the benefit of priority to Chinese Patent Application No. 201410251323.8, filed on Jun. 6, 2014, which applications are hereby incorporated into the present application by reference herein in their respective entireties.

TECHNICAL FIELD

This application relates to biometric authentication technologies, and, for example, to a biometric authentication method and a biometric authentication apparatus.

BACKGROUND

Smart glasses may become a next mobile Internet data access platform, which, while providing users with new user experience, has some traditional Internet security issues. For example, traditional webpage administrators need to reject some access requests from machines. Different tests (for example, biometric authentication) for identifying an identity of an access initiator are thus developed, to ensure that a received request is from a human user rather than a machine or program. A common test is the Completely Automated Public Turing Test to Tell Computers and Humans Apart (CAPTCHA). Generally, the CAPTCHA displays a deformed display image that is difficult for a machine to identify, and requires a user to input a number or letter in the deformed display image, or answer a question in the deformed display image. However, with the continuous development of computer technologies, the rate of identification of the machine on the deformed display image is increasingly high, and the identification speed is increasingly fast; thus, security of the CAPTCHA needs to be further improved, and generally, the CAPTCHA requires that a device should have a keyboard, a mouse or other input components.

SUMMARY

An example, non-limiting objective of this application is to provide a biometric authentication solution.

According to a first example aspect, this application provides a biometric authentication method, comprising:

obtaining, in response to an access request, verification information for biometric authentication and at least one piece of depth information corresponding to at least one presentation depth of the verification information;

presenting the verification information at the at least one presentation depth according to the at least one piece of depth information;

acquiring gaze point depth information of at least one eye of a user during presentation of the verification information; and analyzing whether the gaze point depth information is consistent with the at least one piece of depth information, to determine whether the biometric authentication succeeds.

According to a second example aspect, this application provides a biometric authentication method, comprising:

obtaining, in response to an access request, verification information for biometric authentication and at least one piece of depth information corresponding to at least one presentation depth of the verification information;

providing to a second device with the verification information and the at least one piece of depth information;

acquiring, from the second device, gaze point depth information of at least one eye of a user during presentation of the verification information; and analyzing whether the gaze point depth information is consistent with the at least one piece of depth information, to determine whether the biometric authentication succeeds.

According to a third example aspect, this application provides a biometric authentication method, comprising:

acquiring, from a first device, verification information for biometric authentication and at least one piece of depth information corresponding to at least one presentation depth of the verification information;

presenting the verification information at the at least one presentation depth according to the at least one piece of depth information;

acquiring gaze point depth information of at least one eye of a user during presentation of the verification information; and providing to the first device with the gaze point depth information.

According to a fourth example aspect, this application provides a biometric authentication apparatus, comprising:

a first information acquisition module, configured to obtain, in response to an access request, verification information for biometric authentication and at least one piece of depth information corresponding to at least one presentation depth of the verification information;

a presentation module, configured to present the verification information at the at least one presentation depth according to the at least one piece of depth information;

a second information acquisition module, configured to acquire gaze point depth information of at least one eye of a user during presentation of the verification information; and an analysis module, configured to analyze whether the gaze point depth information is consistent with the at least one piece of depth information, to determine whether the biometric authentication succeeds.

According to a fifth example aspect, this application provides a near-eye wearable device, comprising the biometric authentication apparatus according to the fourth aspect.

According to a sixth example aspect, this application provides a biometric authentication apparatus, comprising:

a first information acquisition module, configured to obtain, in response to an access request, verification information for biometric authentication and at least one piece of depth information corresponding to at least one presentation depth of the verification information;

a communications module, configured to provide to a second device with the verification information and the at least one piece of depth information, wherein the communications module is further configured to acquire, from the second device, gaze point depth information of at least one eye of a user during presentation of the verification information; and an analysis module, configured to analyze whether the gaze point depth information is consistent with the at least one piece of depth information, to determine whether the biometric authentication succeeds.

According to a seventh example aspect, this application provides a biometric authentication apparatus, comprising:

a communications module, configured to acquire, from a first device, verification information for biometric authentication and at least one piece of depth information corresponding to at least one presentation depth of the verification information;

a presentation module, configured to present the verification information at the at least one presentation depth according to the at least one piece of depth information; and a second information acquisition module, configured to acquire gaze point depth information of at least one eye of a user during presentation of the verification information, wherein the communications module is further configured to provide to the first device with the gaze point depth information.

According to an eighth example aspect, this application provides a near-eye wearable device, comprising the biometric authentication apparatus according to the seventh aspect.

According to at least one example embodiment of this application, verification information for biometric authentication is presented at a depth corresponding to the verification information, and whether the biometric authentication succeeds is determined by determining whether a gaze point depth of an eye of a user during presentation of the verification information is consistent with the depth, thereby improving security of authentication.

DETAILED DESCRIPTION

Figure 1:
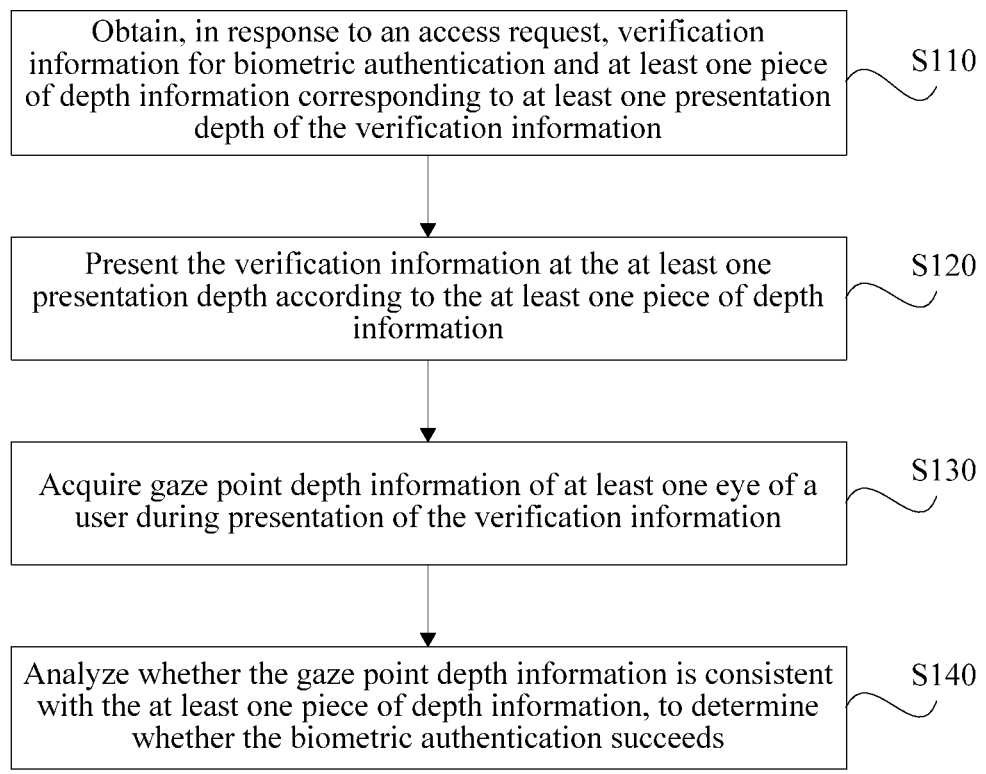
FIG. 1 is a schematic flowchart of a biometric authentication method according to an example embodiment of this application.

Example embodiments of this application are described in detail hereinafter with reference to the accompanying drawings (same elements are indicated by same reference numerals in the accompanying drawings) and embodiments. The following embodiments are intended to describe this application, but not to limit the scope of this application.

It should be understood by those skilled in the art that the terms such as "first" and "second" are merely intended to distinguish different steps, devices or modules, or the like, which neither represent any particular technical meaning nor indicate a necessary logical sequence between them.

In order to determine whether an access request for an object (for example, an access request for a webpage) is initiated by a human user or a machine, it is necessary to perform biometric authentication for the access request. Access to the corresponding object can be continued only if the biometric authentication succeeds, which means the access request is considered to be initiated by a human user, and otherwise, the access request is considered to be initiated by a machine or other non-human users, and the access is rejected, to ensure security of object access.

As shown in FIG. 1, an example embodiment of this application provides a biometric authentication method, comprising:

S110: Obtain, in response to an access request, verification information for biometric authentication and at least one piece of depth information corresponding to at least one presentation depth of the verification information.

S120: Present the verification information at the at least one presentation depth according to the at least one piece of depth information.

S130: Acquire gaze point depth information of at least one eye of a user during presentation of the verification information.

S140: Analyze whether the gaze point depth information is consistent with the at least one piece of depth information, to determine whether the biometric authentication succeeds.

In this embodiment, the at least one presentation depth is at least one depth of at least one presentation position of the verification information relative to a reference position; the reference position herein may be a viewing position, for example, an eye of a user; or may be a position of a presentation component, for example, a position of a lens of smart glasses. This embodiment of this application is described below by using an example that the reference position is an eye of a user.

In this embodiment, the gaze point depth information is depth information of a gaze point of at least one eye of the user relative to the eye of the user.

For example, a first biometric authentication apparatus provided in this application serves as an execution body in this embodiment, to perform S110 to S140. Specifically, the first biometric authentication apparatus may be disposed in a user equipment through software, hardware or a combination thereof, or the first biometric authentication apparatus is the user equipment; the user equipment comprises, but is not limited to: smart glasses, a smart helmet and other near-eye presentation devices as well as a mobile phone, a computer and other devices, wherein the smart glasses comprise smart frame glasses and smart contact lenses. In this embodiment of this application, the user is a user of the user equipment, for example, when the user equipment is smart glasses, the user is a user wearing the smart glasses.

According to this embodiment of this application, verification information for biometric authentication is presented at a depth corresponding to the verification information, and whether the biometric authentication succeeds is determined by determining whether a gaze point depth of an eye of a user during presentation of the verification information is consistent with the depth, thereby improving accuracy of authentication and security of object access.

Figure 2:
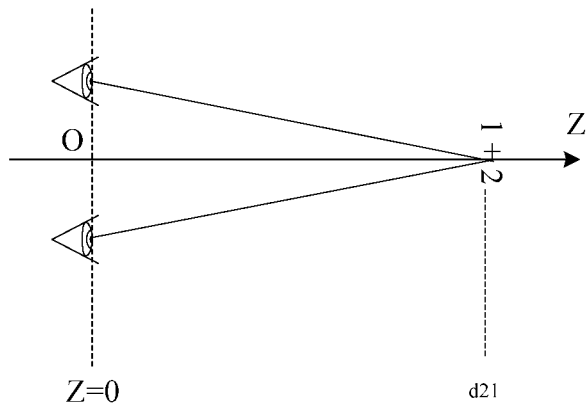
FIG. 2 is a schematic diagram showing that presentation depths of verification information in a biometric authentication method are identical according to an example embodiment of this application.

In one example embodiment of this application, as shown in FIG. 2, verification information "1+2" may be presented at a same presentation depth d21 as a whole. At this time, the at least one piece of depth information is one piece of depth information.

Figure 3A:
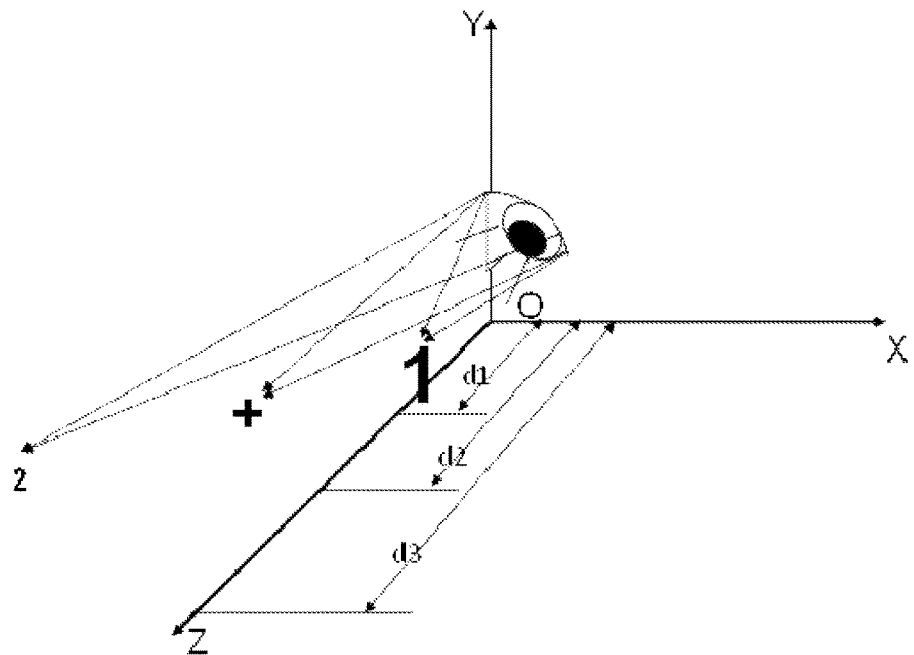
FIG. 3a is a schematic diagram showing that near-eye presentation depths of a plurality of image elements in verification information in a biometric authentication method are different according to an example embodiment of this application.
Figure 3B:
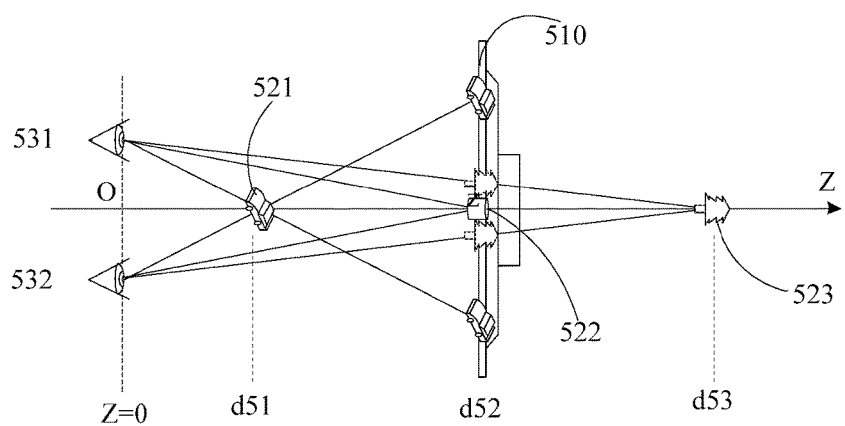
FIG. 3b is a schematic diagram showing that three-dimensional presentation depths of a plurality of image elements in verification information in a biometric authentication method are different according to an example embodiment of this application.

Alternatively, in another example embodiment of this application, the verification information may comprise a plurality of image elements, wherein a presentation depth corresponding to at least one image element is different from presentation depths corresponding to other image element(s). As shown in FIG. 3a or FIG. 3b, the plurality of image elements corresponds to a plurality of presentation depths. At this time, the at least one piece of depth information is a plurality of pieces of depth information corresponding to a plurality of presentation depths.

Steps of the two example embodiments of the method in this embodiment of this application are further described below respectively.

Figure 4:
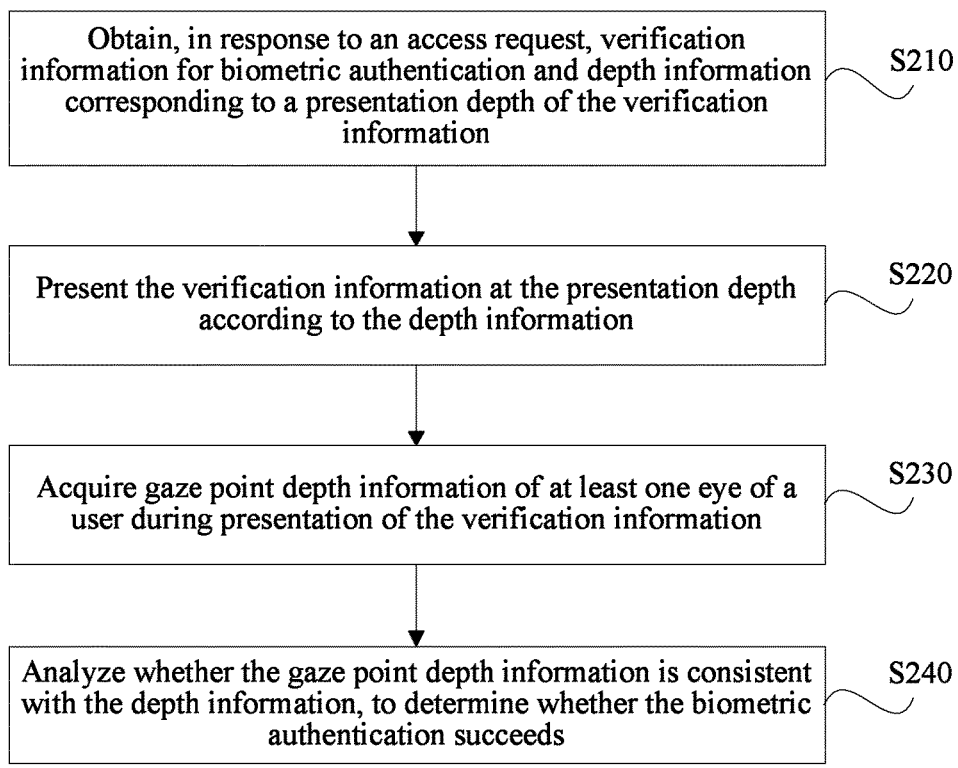
FIG. 4 is a schematic flowchart of a biometric authentication method according to an example embodiment of this application.

As shown in FIG. 4, when the verification information is presented at a same presentation depth, the method comprises:

S210: Obtain, in response to an access request, verification information for biometric authentication and depth information corresponding to a presentation depth of the verification information.

In this embodiment of this application, the verification information may comprise: a word or number with a meaning, or a pattern with no particular meaning, as long as it can be presented and seen by a user. The verification information may be obtained from an external server, for example, when the access request is an access request for a webpage, the verification information can be acquired from a server corresponding to the webpage.

In this embodiment of this application, in order to improve security of biometric authentication, depth information respectively corresponding to a plurality of verification information corresponding to a plurality of access requests should not be exactly the same. Therefore, in this example embodiment, the obtaining depth information comprises:

determining the depth information according to a set policy.

The set policy herein may be set as required, for example, depth information corresponding to verification information generated at a time is that obtained by adding a corresponding value to or subtracting a corresponding value from a presentation depth corresponding to depth information corresponding to previous verification information. For example, if the depth information corresponding to the previous verification information corresponds to a presentation depth of 1 m, depth information corresponding to current verification information corresponds to a presentation depth of 1 m+1 m, and depth information corresponding to next verification information corresponds to a presentation depth of 2 m+1 m. Certainly, a distance range may be determined for the presentation depth according to a presentation capability of a presentation device, a comfortable viewing distance of an eye of a user and other factors.

In one example embodiment, the set policy may be random within a set range. The set range may be a depth information library comprising lots of different depth information, and depth information corresponding to verification information at a time may be randomly selected from the depth information library.

S220: Present the verification information at the presentation depth according to the depth information.

For example, when the depth information is 1 m, the verification information is presented at a presentation depth of 1 m relative to an eye of a user.

In this embodiment of this application, the presentation may be represented as presentation of a presentation depth of a presented object.

In one example embodiment, the presentation is near-eye presentation. That is, in this embodiment of this application, the verification information is presented through near-eye presentation. The near-eye presentation is presenting an image to an eye through display or projection near the eye. For example, the near-eye presentation is implemented by using a Google Glass or other near-eye projection devices, wherein corresponding verification information can be presented at a set presentation depth by adjusting an optical path parameter of an optical path between a projector and an eye.

In another example embodiment, the presentation may be three-dimensional display. For example, 3D verification information is displayed by using a 3D display. In this example embodiment, the gaze point of the at least one eye of the user is a convergence point of lines of sight of two eyes of the user.

S230: Acquire gaze point depth information of at least one eye of a user during presentation of the verification information.

In one example embodiment of this application, gaze point depth information of two eyes of the user can be determined by tracking gazing directions of the two eyes of the user. In one example embodiment, the tracking may be performed by collecting images of the eyes of the user by using a near-eye device, for example, the gazing directions of the two eyes of the user are determined by photographing images of the two eyes of the user by using smart glasses having a photographing module, then the gaze point is obtained according to an intersection of lines of sight of the two eyes of the user, and finally the gaze point depth information can be obtained according to an interorbital distance and the gazing directions of the user. Alternatively, in another example embodiment, for example, when the verification information is three-dimensionally presented on a 3D display screen of a computer, a mobile phone or other user equipments, the tracking may also be tracking the gazing directions of the two eyes of the user by using an image collecting module on one side of the 3D display screen of the computer or mobile phone.

In still another example embodiment, when the verification information is presented by using a near-eye presentation user device such as smart glasses or a smart helmet, because the position of a focus of an eye of the user overlaps with that of a gaze point of the eye at this time, a gaze point of an eye of the user may also be acquired according to an eye focal length detection apparatus. For example, the position of the focus can be determined, by photographing an image of a fundus of an eye of the user, according to an optical parameter of an optical path between a photographing position, obtained when a photographed image of the fundus of the user meeting a set definition target is photographed, and the eye and a gazing direction of the eye, so as to obtain gaze point depth information of the eye.

Certainly, it can be known by those skilled in the art that other suitable methods for detecting a gaze point of an eye of a user may also be applied to this embodiment of this application.

In one example embodiment, the gaze point depth information may also be acquired from the outside by means of communication. For example, when the execution body in this embodiment of this application is a computer, it may communicate with a pair of smart glasses that the user wears, to acquire the gaze point depth information from the smart glasses.

S240: Analyze whether the gaze point depth information is consistent with the depth information, to determine whether the biometric authentication succeeds.

In this embodiment of this application, that the gaze point depth information is consistent with the depth information may be that a gaze point depth corresponding to the gaze point depth information is equal to a depth corresponding to the depth information; or a difference between the two is within a set difference range.

Figure 5:
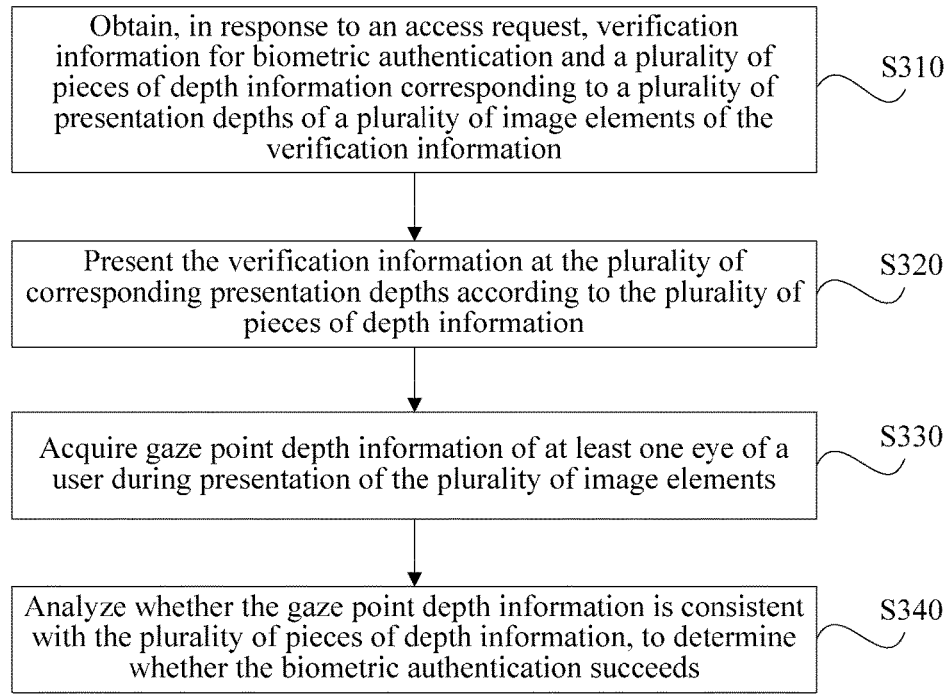
FIG. 5 is a schematic flowchart of a biometric authentication method according to an example embodiment of this application.

As shown in FIG. 5, in another embodiment of this application, when the verification information may comprise a plurality of image elements, the method comprises:

S310: Obtain, in response to an access request, verification information for biometric authentication and a plurality of pieces of depth information corresponding to a plurality of presentation depths of a plurality of image elements of the verification information.

As shown in FIG. 3a or FIG. 3b, in one example embodiment, in the plurality of image elements, a presentation depth of each image element is different from that of another image element. Certainly, in other example embodiments of this embodiment of this application, presentation depths of some image elements may be the same.

Similar to the embodiment shown in FIG. 4, in this embodiment of this application, the plurality of pieces of depth information may be determined according to a set policy. In one example embodiment, the determining the at least one piece of depth information according to a set policy may be: randomly determining the at least one piece of depth information within a set range. Reference can be made to the corresponding description in the embodiment shown in FIG. 4 for determination of the plurality of pieces of depth information, which is not repeated herein.

S320: Present the verification information at the plurality of corresponding presentation depths according to the plurality of pieces of depth information.

In this embodiment of this application, the verification information may be presented in a manner the same as that described in the embodiment shown in FIG. 4. As the verification information comprises a plurality of image elements, different from the embodiment shown in FIG. 4, in this embodiment of this application, the plurality of image elements may be simultaneously presented at different presentation depths respectively, or the plurality of image elements may be presented at the plurality of corresponding presentation depths in a set time sequence.

In one example embodiment, description is given by using an example that the verification information is presented by using a projection display module of smart glasses. As shown in FIG. 3a, an XOY plane is a plane in which an eye of a user is located, a value on OZ indicates a value of a depth from the eye, and the verification information comprises elements "2", "+" and "1", respectively corresponding to depths of d3, d2 and d1 relative to the eye of the user. In one example embodiment, when the verification information is presented, a presentation device adjusts a presentation parameter thereof in the set time sequence, to cause the element "2" to be presented at the depth of d3, the presentation parameter is further adjusted after a set time interval (for example, 1 second), to cause the element "+" to be presented at the depth of d2, and finally, in a similar way, the element "1" is presented at the depth of d1.

In one example embodiment, in order to further increase security of the verification information, when the verification information is presented, image elements of the verification information are presented in a set time sequence and at a random time interval. Herein, the random time interval is generally random within a set time interval range, for example, random within a range of (0, 2) seconds. For example, in this example embodiment, the element "2" is presented first, after a random time interval, for example, 0.5 second, the element "+" is presented, and after a random time interval, for example, 1.2 seconds, the element "1" is presented. With such random time intervals, the verification information is more difficult to be cracked by a machine, thereby improving security.

In another example embodiment, description is given by using an example that presentation of the verification information is three-dimensional presentation. As shown in FIG. 3b, a plane of Z=0 is a plane in which an eye of a user is located, a value on OZ indicates a value of a depth from the eye, the verification information comprises three image elements: a car pattern 521, a cylinder pattern 522 and a tree pattern 523, and presentation depths corresponding thereto are respectively d51, d52 and d53. Certainly, in one example embodiment, the presentation depths of the image elements may also be determined by using a display plane of a 3D display 510 that presents the verification information as a reference position. It can be seen from FIG. 3b that, when the user views the image elements separately, positions of convergence points of lines of sight of a left eye 531 and a right eye 532 are different.

S330: Acquire gaze point depth information of at least one eye of a user during presentation of the plurality of image elements.

In this embodiment of this application, as the plurality of image elements of the verification information is presented at different positions, gaze point depth information corresponding to a presentation depth of each image element is acquired correspondingly when the gaze point depth information of the eye of the user is acquired.

In one example embodiment, when the plurality of image elements is presented in the set time sequence, the gaze point depth information may also be change rule information of gaze point depths of the user. For example, a time interval at which gazing depths of the user change is comprised.

Like the corresponding description in the embodiment shown in FIG. 4, when the gaze point depth information corresponding to each image element is acquired, gaze point depth information of two eyes of the user may be determined by tracking gazing directions of the two eyes of the user. Alternatively, the gaze point depth information may also be acquired by using other methods. Reference can be made to the corresponding description in the embodiment shown in FIG. 4 for details, which are not repeated herein.

S340: Analyze whether the gaze point depth information is consistent with the plurality of pieces of depth information, to determine whether the biometric authentication succeeds.

Similar to the embodiment shown in FIG. 4, in one example embodiment of this application, when the gaze point depth information comprises a gaze point depth corresponding to each image element, that the gaze point depth information is consistent with the plurality of pieces of depth information may be that the gaze point depth of each image element corresponding to the gaze point depth information is equal to a depth corresponding to the depth information of the image element; or a difference between the two is within a set difference range.

Alternatively, in another example embodiment, when the gaze point depth information is change rule information of gaze point depths of the user, that the gaze point depth information is consistent with the plurality of pieces of depth information may also be that the change rule information is consistent with changes in presentation depths corresponding to depth information corresponding to a presentation sequence of the image elements, or may comprise that changing time interval information is consistent with random time intervals at which the image elements are presented.

In one scenario, for example, while wearing a near-eye presentation device, a user may access a webpage displayed on a display screen of another user equipment (for example, a mobile phone or a computer), at this time, for example, corresponding verification information and corresponding depth information may be acquired by using the another user equipment, but the near-eye presentation device presents verification information corresponding to the depth information and acquires corresponding gaze point depth information, and then the another user equipment acquires the gaze point depth information from the near-eye presentation device to perform the biometric authentication.

Figure 6:
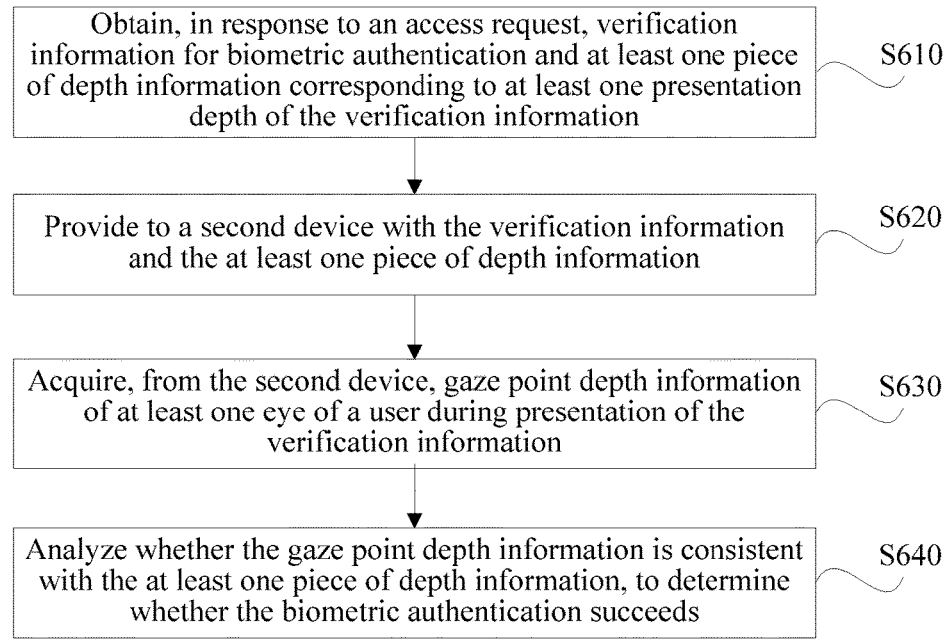
FIG. 6 is a schematic flowchart of a biometric authentication method according to an example embodiment of this application.

Therefore, as shown in FIG. 6, an embodiment of this application further provides a biometric authentication method, comprising:

S610: Obtain, in response to an access request, verification information for biometric authentication and at least one piece of depth information corresponding to at least one presentation depth of the verification information.

S620: Provide to a second device with the verification information and the at least one piece of depth information.

S630: Acquire, from the second device, gaze point depth information of at least one eye of a user during presentation of the verification information.

S640: Analyze whether the gaze point depth information is consistent with the at least one piece of depth information, to determine whether the biometric authentication succeeds.

For example, a second biometric authentication apparatus provided in this application serves as an execution body in this embodiment, to perform S610 to S640. Specifically, the second biometric authentication apparatus may be disposed in a user equipment through software, hardware or a combination thereof, or the second biometric authentication apparatus is the user equipment; the user equipment comprises, but is not limited to: smart phones, a computer, a tablet computer and other intelligent devices with a display capability. Like the embodiment shown in FIG. 1, in this embodiment of this application, the user is a user of the user equipment. In this embodiment of this application, the second device, for example, may be smart glasses, a smart helmet or other near-eye presentation devices, and the user is also a user of the second device.

According to this embodiment of this application, verification information for biometric authentication and corresponding depth information are sent to a corresponding second device to be presented at a corresponding depth, and whether the biometric authentication succeeds is determined by determining whether a gaze point depth of an eye of a user during presentation of the verification information is consistent with the depth, thereby improving accuracy of authentication and security of object access.

Like the embodiment shown in FIG. 1, in this embodiment of this application, the verification information may correspond to a same presentation depth as a whole, or may comprise a plurality of image elements and correspond to a plurality of different presentation depths, that is, the verification information comprises a plurality of image elements, and the at least one piece of depth information is a plurality of pieces of depth information corresponding to a plurality of presentation depths; and in the plurality of image elements, at least one image element and other image element(s) respectively correspond to different depth information in the plurality of pieces of depth information. Reference can be made to the corresponding description in FIG. 1, FIG. 4 or FIG. 5 for details.

In this embodiment of this application, specific implementation of step S610 and step S640 is the same as that of the corresponding steps in the embodiment shown in FIG. 1, FIG. 4 or FIG. 5, only simple description is given below, and reference can be made to description about the corresponding steps in FIG. 1, FIG. 4 or FIG. 5 for details.

For step S610, the at least one piece of depth information may be determined according to a set policy.

Optionally, the determining the at least one piece of depth information according to a set policy comprises: randomly determining the at least one piece of depth information within a set range.

For step S620 and step S630, the two steps may be performed through communication with the second device in a wired or wireless communication manner. For example, in step S620, the verification information and the at least one piece of depth information may be sent to the second device; when the second device correspondingly presents the verification information and acquires corresponding gaze point depth information, in step S630, gaze point depth information, returned by the second device, of at least one eye of a user during presentation of the verification information is received.

After the analysis in step S640, the biometric authentication can be completed, so as to determine whether the access is initiated by the user or a non-human user.

Reference can be made to the description about the corresponding steps in the embodiments shown in FIG. 1 to FIG. 5 for the steps in this embodiment of this application, which are not repeated herein.

Certainly, it can be known by those skilled in the art that, in another example embodiment, the execution body of the biometric authentication method in this embodiment of this application may also belong to a server.

Figure 7:
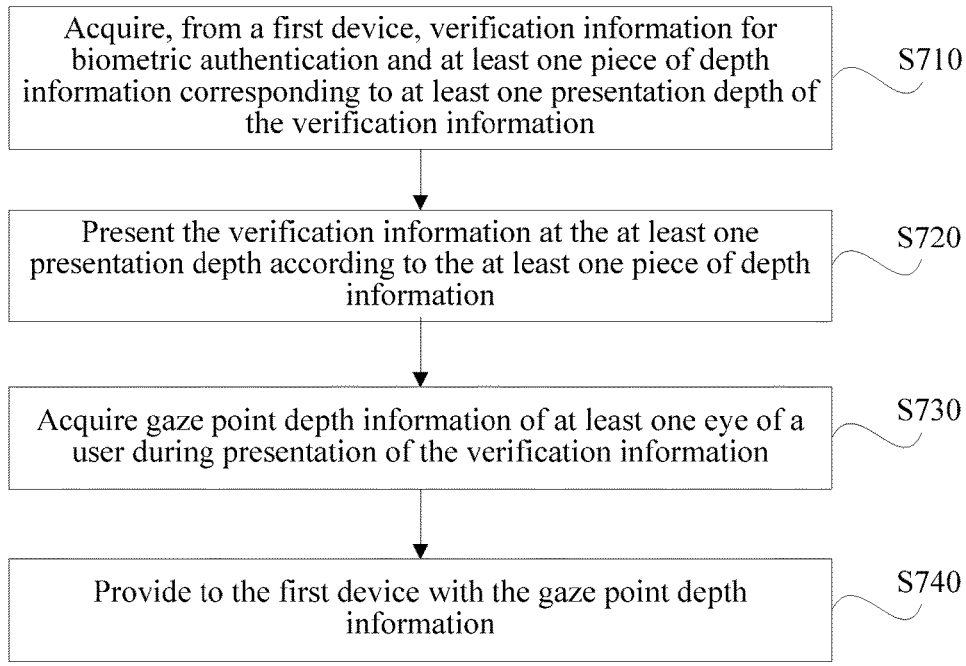
FIG. 7 is a schematic flowchart of a biometric authentication method according to an example embodiment of this application.

Based on the forgoing scenario, as shown in FIG. 7, an embodiment of this application further provides a biometric authentication method, comprising:

S710: Acquire, from a first device, verification information for biometric authentication and at least one piece of depth information corresponding to at least one presentation depth of the verification information.

S720: Present the verification information at the at least one presentation depth according to the at least one piece of depth information.

S730: Acquire gaze point depth information of at least one eye of a user during presentation of the verification information.

S740: Provide to the first device with the gaze point depth information.

For example, a third biometric authentication apparatus provided in this application serves as an execution body in this embodiment, to perform S710 to S740. Specifically, the third biometric authentication apparatus may be disposed in a user equipment through software, hardware or a combination thereof, or the third biometric authentication apparatus is the user equipment; the user equipment comprises, but is not limited to: smart glasses, a smart helmet and other near-eye presentation devices, wherein the smart glasses comprise smart frame glasses and smart contact lenses. In this embodiment of this application, the user is a user of the user equipment, for example, when the user equipment is smart glasses, the user is a user wearing the smart glasses.

According to this embodiment of this application, after corresponding verification information and depth information are acquired from a first device, the verification information is presented at a corresponding presentation depth, and gaze point depth information of the user is acquired and sent to the first device, to cause the first device to conveniently determine whether the biometric authentication succeeds by determining whether a gaze point depth of an eye of a user during presentation of the verification information is consistent with the depth, thereby improving accuracy of authentication and security of object access.

Like the embodiment shown in FIG. 1, in this embodiment of this application, the verification information may correspond to a same presentation depth as a whole, or may comprise a plurality of image elements and correspond to a plurality of different presentation depths, that is, the verification information comprises a plurality of image elements, and the at least one piece of depth information is a plurality of pieces of depth information corresponding to a plurality of presentation depths; and in the plurality of image elements, at least one image element and other image element(s) respectively correspond to different depth information in the plurality of pieces of depth information. Reference can be made to the corresponding description in FIG. 1, FIG. 4 or FIG. 5 for details.

In this embodiment of this application, specific implementation of step S720 and step S730 is the same as that of the corresponding steps in the embodiment shown in FIG. 1, FIG. 4 or FIG. 5, the method in this embodiment of this application is simply described below, and reference can be made to description about the corresponding steps in FIG. 1, FIG. 4 or FIG. 5 for details.

In this embodiment of this application, in step S710, the verification information and the depth information are acquired from the first device through communication with the first device.

Reference can be made to the corresponding description in step S120, S220 or S320 for presentation of the verification information in step S720.

Reference can be made to the corresponding description in step S130, S230 or S330 for the method for acquiring the gaze point depth information in step S730.

After the gaze point depth information is acquired in step S730, the gaze point depth information may be sent to the first device through communication with the first device.

Reference can be made to the description about the corresponding steps in the embodiments shown in FIG. 1 to FIG. 5 for the steps in this embodiment of this application, which are not repeated herein.

It should be understood by those skilled in the art that, sequence numbers of the steps do not mean execution sequences in the methods in the example embodiments of this application. The execution sequences of the steps should be determined according to functions and internal logic of the steps, and should not be construed as any limitation to the implementation processes of the example embodiments of this application.

Figure 8:
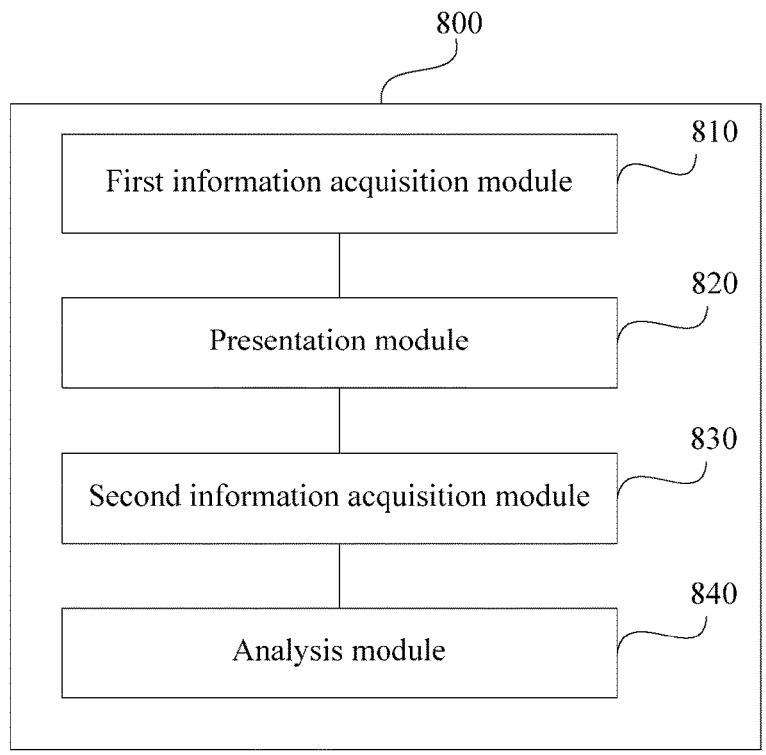
FIG. 8 is a schematic structural block diagram of a first biometric authentication apparatus according to an example embodiment of this application.

As shown in FIG. 8, an embodiment of this application provides a first biometric authentication apparatus 800, comprising:

a first information acquisition module 810, configured to obtain, in response to an access request, verification information for biometric authentication and at least one piece of depth information corresponding to at least one presentation depth of the verification information;

a presentation module 820, configured to present the verification information at the at least one presentation depth according to the at least one piece of depth information;

a second information acquisition module 830, configured to acquire gaze point depth information of at least one eye of a user during presentation of the verification information; and an analysis module 840, configured to analyze whether the gaze point depth information is consistent with the at least one piece of depth information, to determine whether the biometric authentication succeeds.

In this embodiment, the at least one presentation depth is at least one depth of at least one presentation position of the verification information relative to a reference position; the reference position herein may be a viewing position, for example, an eye of a user; or may be a position of a presentation component, for example, a position of a lens of smart glasses. This embodiment of this application is described below by using an example that the reference position is an eye of a user.

In this embodiment, the gaze point depth information is depth information of a gaze point of at least one eye of the user relative to the eye of the user.

According to this embodiment of this application, verification information for biometric authentication is presented at a depth corresponding to the verification information, and whether the biometric authentication succeeds is determined by determining whether a gaze point depth of an eye of a user during presentation of the verification information is consistent with the depth, thereby improving accuracy of authentication and security of object access.

In one example embodiment of this application, as shown in FIG. 2, the verification information may be presented at a same presentation depth as a whole. At this time, the at least one piece of depth information is one piece of depth information.

Alternatively, in another example embodiment of this application, the verification information may comprise a plurality of image elements, wherein a presentation depth corresponding to at least one image element is different from presentation depths corresponding to other image element(s). As shown in FIG. 3a or FIG. 3b, the plurality of image elements corresponds to a plurality of presentation depths. At this time, the at least one piece of depth information is a plurality of pieces of depth information corresponding to a plurality of presentation depths.

Modules of the first biometric authentication apparatus in this embodiment of this application are further described below respectively.

Figure 9:
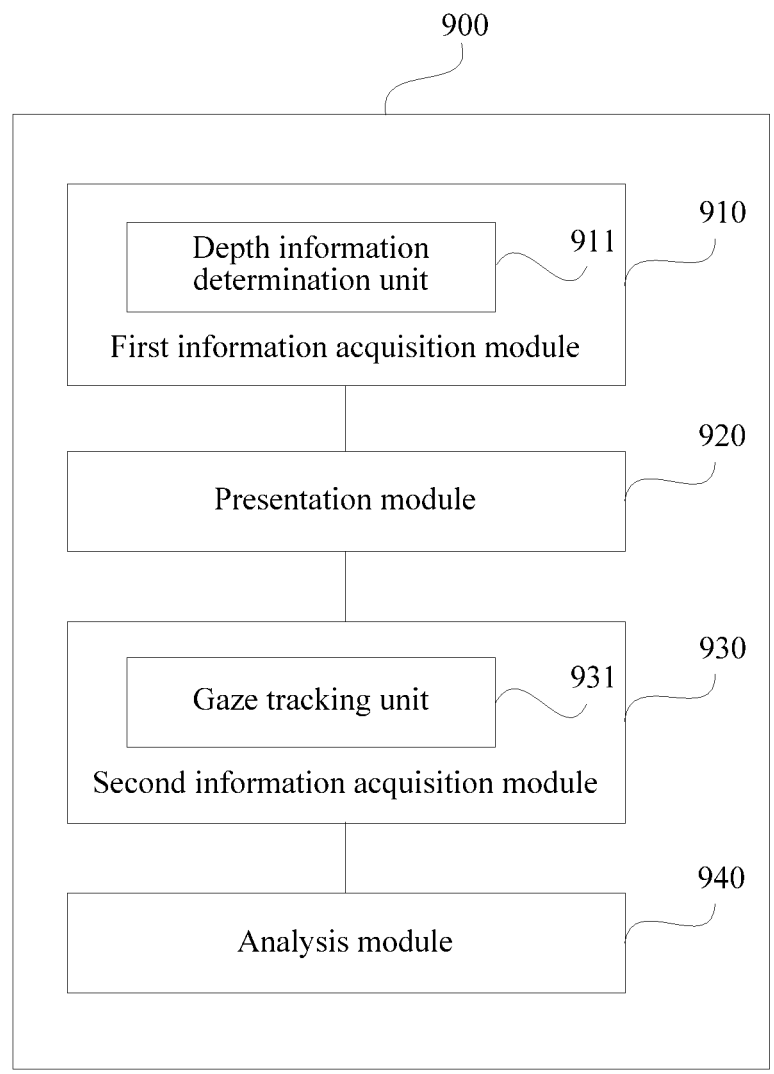
FIG. 9 is a schematic structural block diagram of a first biometric authentication apparatus according to an example embodiment of this application.

As shown in FIG. 9, when the verification information is presented at a same presentation depth, a first biometric authentication apparatus 900 comprises:

a first information acquisition module 910, configured to obtain, in response to an access request, verification information for biometric authentication and depth information corresponding to a presentation depth of the verification information;

a presentation module 920, configured to present the verification information at the presentation depth according to the depth information;

a second information acquisition module 930, configured to acquire gaze point depth information of at least one eye of a user during presentation of the verification information;

and an analysis module 940, configured to analyze whether the gaze point depth information is consistent with the depth information, to determine whether the biometric authentication succeeds.

In this embodiment of this application, the verification information may comprise: a word or number with a meaning, or a pattern with no particular meaning, as long as it can be presented and seen by a user. The verification information may be obtained from an external server, for example, when the access request is an access request for a webpage, the verification information can be acquired from a server corresponding to the webpage.

In this embodiment of this application, in order to improve security of biometric authentication, depth information respectively corresponding to a plurality of verification information corresponding to a plurality of access requests should not be exactly the same.

Therefore, in this example embodiment, optionally, the first information acquisition module 910 comprises:

a depth information determination unit 911, configured to determine the at least one piece of depth information according to a set policy.

In one example embodiment, optionally, the depth information determination unit 911 is further configured to:

randomly determine the at least one piece of depth information within a set range.

Reference can be made to the corresponding description in the embodiment shown in FIG. 4 for implementation of functions of the first information acquisition module 910 and the unit thereof, which is not repeated herein.

Figure 9A:
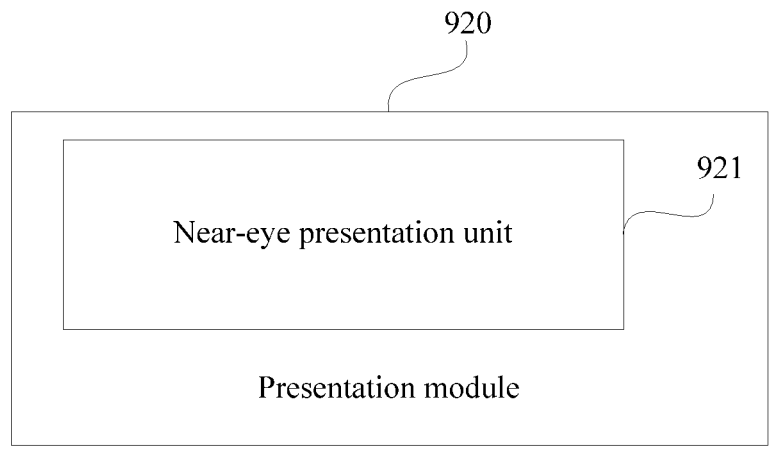
FIG. 9a and FIG. 9b are schematic structural block diagrams of two types of presentation modules of a first biometric authentication apparatus according to an example embodiment of this application.

As shown in FIG. 9a, in one example embodiment of this application, the presentation module 920 may comprise a near-eye presentation unit 921, configured to present the verification information through near-eye presentation. For example, the near-eye presentation unit 921 may be a projection display unit of a pair of smart glasses, and information can be presented at different presentation depths by adjusting a parameter of the near-eye presentation unit 921 (for example, adjusting a parameter such as a focal length of a lens subunit in the near-eye presentation unit 921).

Figure 9B:
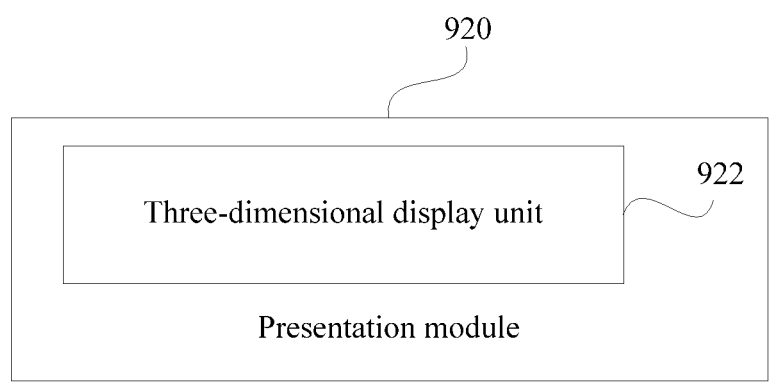

As shown in FIG. 9b, in another example embodiment, the presentation module 920 may comprise a three-dimensional display unit 922, wherein the three-dimensional display unit 922, for example, may be a three-dimensional display screen of a computer, a television, smart glasses or other devices, and information can be presented at different presentation depths by adjusting a position between a left eye image and a right eye image of the verification information.

In one example embodiment, the second information acquisition module 930 may comprise:

a gaze tracking unit 931, configured to determine gaze point depth information of two eyes of the user by tracking gazing directions of the two eyes of the user. Reference can be made to the corresponding description in the embodiment shown in FIG. 4 for details.

Figure 9C:
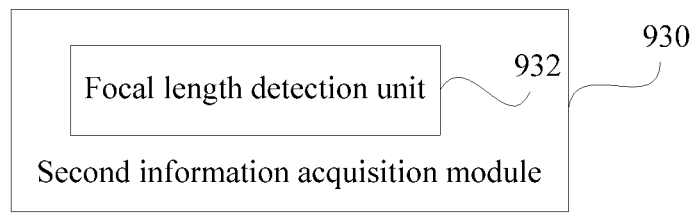
FIG. 9c is a schematic structural block diagram of a second information acquisition module of a first biometric authentication apparatus according to an example embodiment of this application.

As shown in FIG. 9c, in one example embodiment, the second information acquisition module 930 may comprise:

a focal length detection unit 932, comprising a fundus image photographing submodule, configured to determine, by photographing an image of a fundus of an eye of the user, the position of a focus according to an optical parameter of an optical path between a photographing position, obtained when a photographed image of the fundus of the user meeting a set definition target is photographed, and the eye and a gazing direction of the eye, so as to obtain gaze point depth information of the eye. Reference can be made to the corresponding description in the embodiment shown in FIG. 4 for details.

Certainly, it can be known by those skilled in the art that other suitable modules for detecting a gaze point of an eye of a user may also be applied to this embodiment of this application.

In one example embodiment, the second information acquisition module 930 may also acquire the gaze point depth information from the outside by using a communications module. For example, when the execution body in this embodiment of this application is a computer, it may communicate with a pair of smart glasses that the user wears, to acquire the gaze point depth information from the smart glasses.

In this embodiment of this application, when the analysis module 940 performs analysis, that the gaze point depth information is consistent with the depth information may be that a gaze point depth corresponding to the gaze point depth information is equal to a depth corresponding to the depth information; or a difference between the two is within a set difference range.

Figure 10:
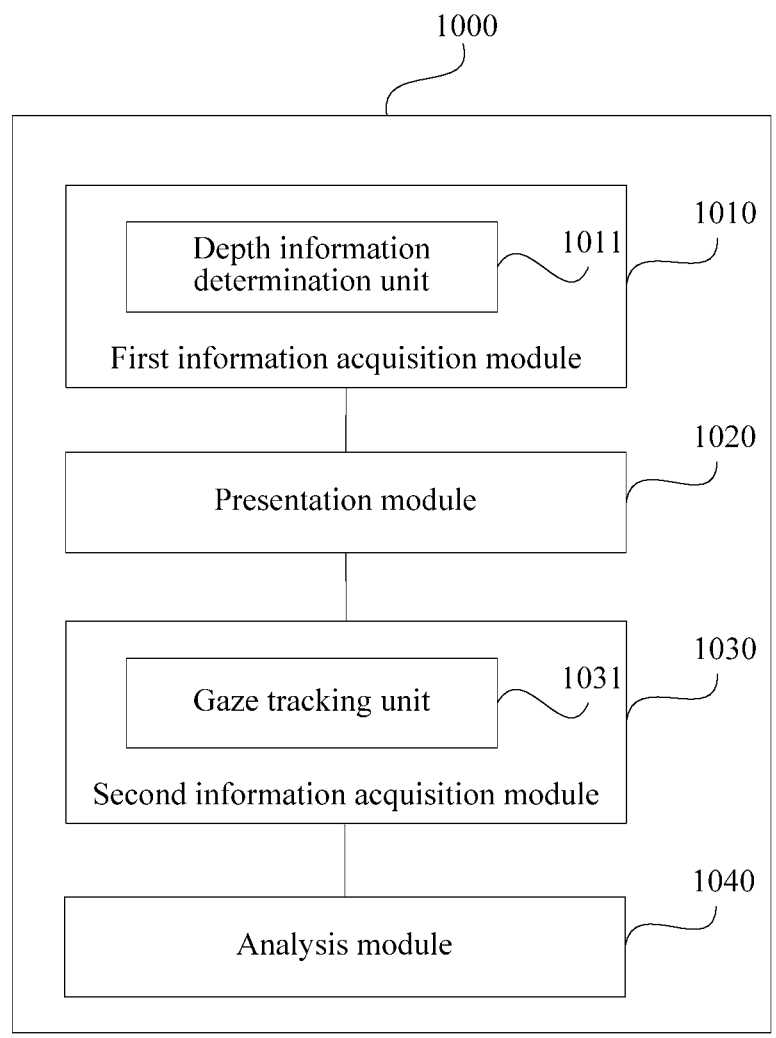
FIG. 10 is a schematic structural block diagram of a first biometric authentication apparatus according to an example embodiment of this application.

As shown in FIG. 10, when the verification information comprises a plurality of image elements, a first biometric authentication apparatus 1000 comprises:

a first information acquisition module 1010, configured to obtain, in response to an access request, verification information for biometric authentication and a plurality of pieces of depth information corresponding to a plurality of presentation depths of a plurality of image elements of the verification information, wherein in the plurality of image elements, at least one image element and other image element(s) respectively correspond to different depth information in the plurality of pieces of depth information;

a presentation module 1020, configured to present the verification information at the plurality of corresponding presentation depths according to the plurality of pieces of depth information;

a second information acquisition module 1030, configured to acquire gaze point depth information of at least one eye of a user during presentation of the plurality of image elements; and an analysis module 1040, configured to analyze whether the gaze point depth information is consistent with the plurality of pieces of depth information, to determine whether the biometric authentication succeeds.

As shown in FIG. 3a or FIG. 3b, in one example embodiment, in the plurality of image elements, a presentation depth of each image element is different from that of another image element. Certainly, in other example embodiments of this embodiment of this application, presentation depths of some image elements may be the same.

Similar to the embodiments shown in FIG. 9, FIG. 9a and FIG. 9b, in this embodiment of this application, optionally, the first information acquisition module 1010 comprises:

a depth information determination unit 1011, configured to determine the plurality of pieces of depth information according to a set policy.

In one example embodiment, optionally, the depth information determination unit 1011 is further configured to:

randomly determine the plurality of pieces of depth information within a set range.

Reference can be made to the corresponding description in the embodiment shown in FIG. 4 for implementation of functions of the first information acquisition module 1010 and the unit thereof, which is not repeated herein.

In this embodiment of this application, the structure of the presentation module 1020 may be the same as that of the presentation module 920 in the embodiment shown in FIG. 9. However, as the verification information comprises a plurality of image elements, different from the embodiment shown in FIG. 9, in this embodiment of this application, the presentation module 1020 may be configured to simultaneously present the plurality of image elements at different presentation depths respectively, or may be configured to present the plurality of image elements at the plurality of corresponding presentation depths in a set time sequence. Reference can be made to the corresponding description in the embodiments shown in FIG. 5, FIG. 3a, FIG. 3b and FIG. 9 for details.

In one example embodiment, the second information acquisition module 1030 may comprise:

a gaze tracking unit 1031, configured to determine gaze point depth information of two eyes of the user by tracking gazing directions of the two eyes of the user. Reference can be made to the corresponding description in the embodiment shown in FIG. 4 for details.

Like the embodiment shown in FIG. 9c, in one example embodiment, the second information acquisition module 1030 may comprise:

a focal length detection unit, comprising a fundus image photographing submodule, configured to determine, by photographing an image of a fundus of an eye of the user, the position of a focus according to an optical parameter of an optical path between a photographing position, obtained when a photographed image of the fundus of the user meeting a set definition target is photographed, and the eye and a gazing direction of the eye, so as to obtain gaze point depth information of the eye. Reference can be made to the corresponding description in the embodiment shown in FIG. 4 for details.

Certainly, it can be known by those skilled in the art that, other suitable modules for detecting a gaze point of an eye of a user may also be applied to this embodiment of this application.

In one example embodiment, the second information acquisition module 1030 may also acquire the gaze point depth information from the outside by using a communications module. For example, when the execution body in this embodiment of this application is a computer, it may communicate with a pair of smart glasses that the user wears, to acquire the gaze point depth information from the smart glasses.

In this embodiment of this application, as the plurality of image elements of the verification information is presented at different positions, gaze point depth information corresponding to a presentation depth of each image element is acquired correspondingly when the second information acquisition module 1030 acquires the gaze point depth information of the eye of the user.

In one example embodiment, when the plurality of image elements is presented in the set time sequence, the gaze point depth information acquired by the second information acquisition module 1030 may also be change rule information of gaze point depths of the user.

Similar to the embodiment shown in FIG. 9, in one example embodiment of this application, when the gaze point depth information comprises a gaze point depth corresponding to each image element, when the analysis module 1040 performs analysis, that the gaze point depth information is consistent with the plurality of pieces of depth information may be that the gaze point depth of each image element corresponding to the gaze point depth information is equal to a depth corresponding to the depth information of the image element; or a difference between the two is within a set difference range.

Alternatively, in another example embodiment, when the gaze point depth information is change rule information of gaze point depths of the user, that the gaze point depth information is consistent with the plurality of pieces of depth information may also be that the change rule information is consistent with changes in presentation depths corresponding to depth information corresponding to a presentation sequence of the image elements.

Figure 11:
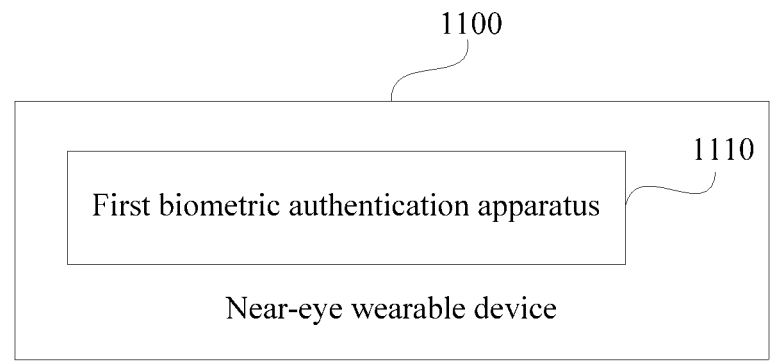
FIG. 11 is a schematic structural block diagram of a near-eye wearable device according to an example embodiment of this application.

As shown in FIG. 11, an embodiment of this application further discloses a near-eye wearable device 1100, comprising the first biometric authentication apparatus 1110 in any one of FIG. 8 to FIG. 10.

In one example embodiment, the near-eye wearable device 1100 is smart glasses or a smart helmet.

Figure 12:
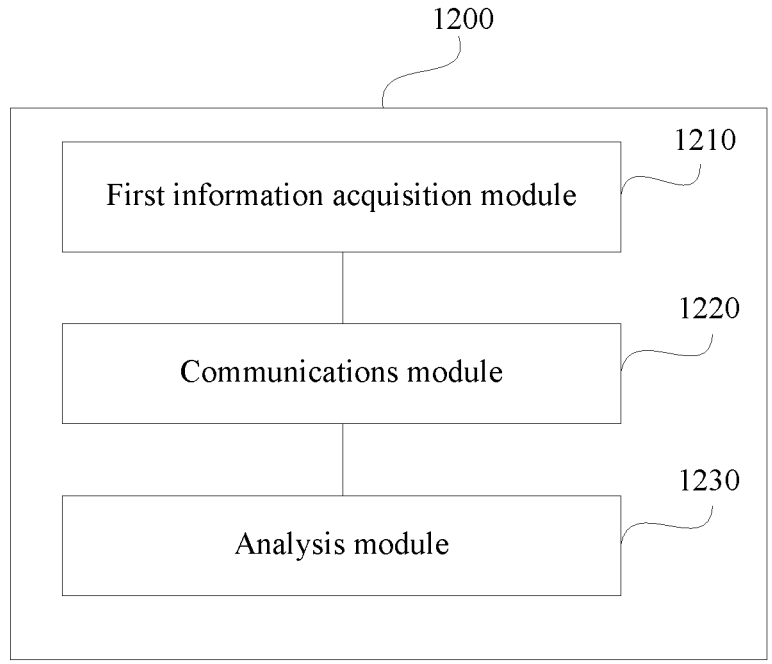
FIG. 12 is a schematic structural block diagram of a second biometric authentication apparatus according to an example embodiment of this application.

As shown in FIG. 12, an embodiment of this application discloses a second biometric authentication apparatus 1200, comprising:

a first information acquisition module 1210, configured to obtain, in response to an access request, verification information for biometric authentication and at least one piece of depth information corresponding to at least one presentation depth of the verification information;

a communications module 1220, configured to provide to a second device with the verification information and the at least one piece of depth information, wherein the communications module 1220 is further configured to acquire, from the second device, gaze point depth information of at least one eye of a user during presentation of the verification information; and an analysis module 1230, configured to analyze whether the gaze point depth information is consistent with the at least one piece of depth information, to determine whether the biometric authentication succeeds.

In this embodiment of this application, the second device, for example, may be smart glasses, a smart helmet or other near-eye presentation devices.

According to this embodiment of this application, verification information for biometric authentication and corresponding depth information are sent to a corresponding second device to be presented at a corresponding depth, and whether the biometric authentication succeeds is determined by determining whether a gaze point depth of an eye of a user during presentation of the verification information is consistent with the depth, thereby improving accuracy of authentication and security of object access.

Like the embodiment shown in FIG. 8, in this embodiment of this application, the verification information may correspond to a same presentation depth as a whole, or may comprise a plurality of image elements and correspond to a plurality of different presentation depths, that is, the verification information comprises a plurality of image elements, and the at least one piece of depth information is a plurality of pieces of depth information corresponding to a plurality of presentation depths; and in the plurality of image elements, at least one image element and other image element(s) respectively correspond to different depth information in the plurality of pieces of depth information. Reference can be made to the corresponding description in the embodiment shown in FIG. 8, FIG. 9 or FIG. 10 for details.

In this embodiment of this application, structures and functions of the first information acquisition module 1210 and the analysis module 1230 are the same as those of the first information acquisition module and the analysis module in the embodiment shown in FIG. 9 or FIG. 10, which are not repeated herein.

In this embodiment of this application, the communications module 1220 may be a wired communications module or a wireless communications module, configured to perform communication and data and signal transmission with the second device.

Reference can be made to the corresponding description in the embodiment shown in FIG. 6, FIG. 8, FIG. 9 or FIG. 10 for implementation of the functions of the modules in this embodiment of this application, which is not repeated herein.

Figure 13:
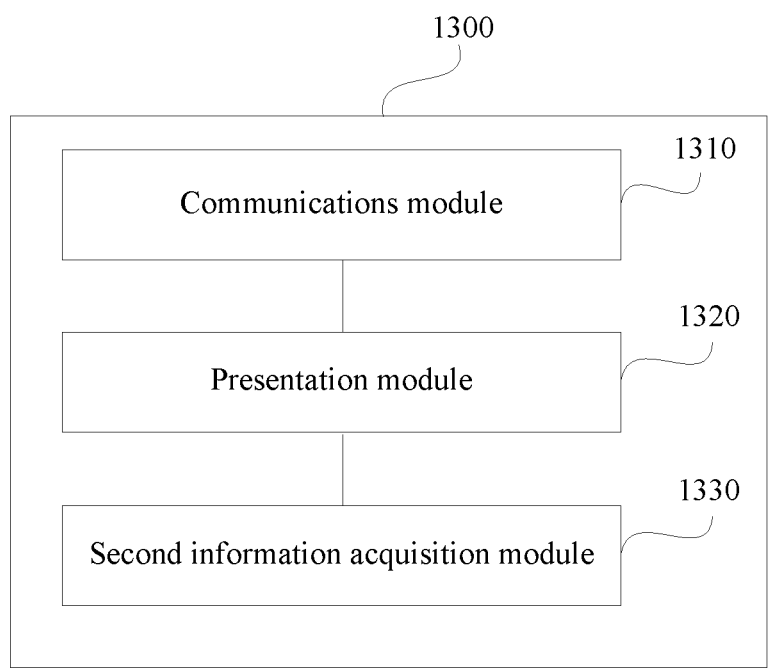
FIG. 13 is a schematic structural block diagram of a third biometric authentication apparatus according to an example embodiment of this application.

As shown in FIG. 13, an embodiment of this application discloses a third biometric authentication apparatus 1300, comprising:

a communications module 1310, configured to acquire, from a first device, verification information for biometric authentication and at least one piece of depth information corresponding to at least one presentation depth of the verification information;

a presentation module 1320, configured to present the verification information at the at least one presentation depth according to the at least one piece of depth information; and a second information acquisition module 1330, configured to acquire gaze point depth information of at least one eye of a user during presentation of the verification information, wherein the communications module 1340 is further configured to provide to the first device with the gaze point depth information.

According to this embodiment of this application, after corresponding verification information and depth information are acquired from a first device, the verification information is presented at a corresponding presentation depth, and gaze point depth information of the user is acquired and sent to the first device, to cause the first device to conveniently determine whether the biometric authentication succeeds by determining whether a gaze point depth of an eye of a user during presentation of the verification information is consistent with the depth, thereby improving accuracy of authentication and security of object access.

Like the embodiment shown in FIG. 8, in this embodiment of this application, the verification information may correspond to a same presentation depth as a whole, or may comprise a plurality of image elements and correspond to a plurality of different presentation depths, that is, the verification information comprises a plurality of image elements, and the at least one piece of depth information is a plurality of pieces of depth information corresponding to a plurality of presentation depths; and in the plurality of image elements, at least one image element and other image element(s) respectively correspond to different depth information in the plurality of pieces of depth information. Reference can be made to the corresponding description in FIG. 8, FIG. 9 or FIG. 10 for details.

In this embodiment of this application, structures and functions of the presentation module 1320 and the second information acquisition module 1330 are the same as those of the presentation module and the second information acquisition module in the embodiment shown in FIG. 9 or FIG. 10, which are not repeated herein.

In this embodiment of this application, the communications module 1310 may be a wired communications module or a wireless communications module, configured to perform communication and data and signal transmission with the second device.

Reference can be made to the corresponding description in the embodiment shown in FIG. 7, FIG. 8, FIG. 9 or FIG. 10 for implementation of the functions of the modules in this embodiment of this application, which is not repeated herein.

Figure 14:
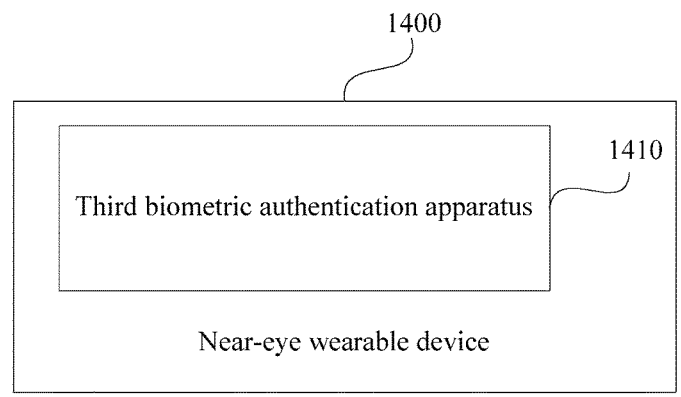
FIG. 14 is a schematic structural block diagram of a near-eye wearable device according to an example embodiment of this application.

As shown in FIG. 14, an embodiment of this application provides a near-eye wearable device 1400, comprising the third biometric authentication apparatus 1410 in the embodiment shown in FIG. 13.

Figure 15:
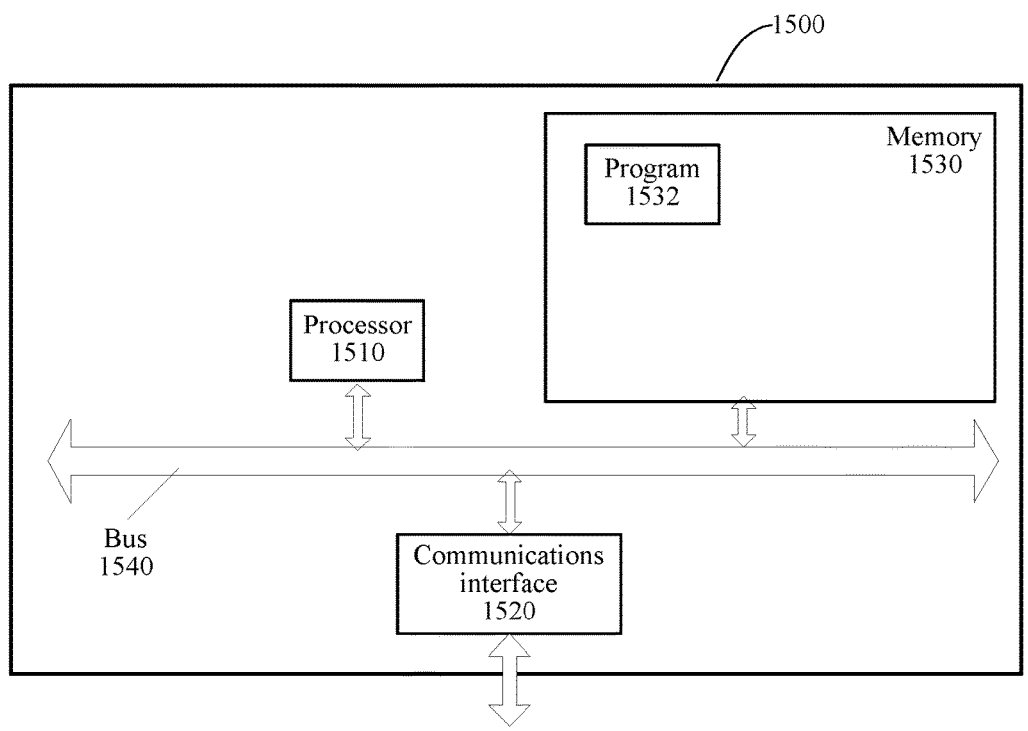
FIG. 15 is a schematic structural block diagram of a biometric authentication apparatus according to an example embodiment of this application.

FIG. 15 is a schematic structural diagram of still another biometric authentication apparatus 1500 according to an embodiment of this application. The specific embodiment of this application sets no limitations to specific implementation of the biometric authentication apparatus 1500. As shown in FIG. 15, the biometric authentication apparatus 1500 may comprise:

a processor 1510, a communications interface 1520, a memory 1530, and a communications bus 1540.

The processor 1510, the communications interface 1520, and the memory 1530 perform mutual communication via the communications bus 1540.

The communications interface 1520 is configured to communicate with a network element such as a client.

The processor 1510 is configured to execute a program 1532, and specifically, can implement relevant steps in the method embodiments.

Specifically, the program 1532 may comprise program code, and the program code comprises a computer operation instruction.

The processor 1510 may be a central processing unit (CPU), or an application specific integrated circuit (ASIC), or be configured to be one or more integrated circuits that implement the embodiments of this application.

The memory 1530 is configured to store the program 1532. The memory 1530 may comprise a high-speed RAM memory, and may also comprise a non-volatile memory, for example, at least one disk memory.

In one example embodiment, the program 1532 may be specifically used to enable the biometric authentication apparatus 1500 to perform the following steps:

obtaining, in response to an access request, verification information for biometric authentication and at least one piece of depth information corresponding to at least one presentation depth of the verification information;

presenting the verification information at the at least one presentation depth according to the at least one piece of depth information;

acquiring gaze point depth information of at least one eye of a user during presentation of the verification information; and analyzing whether the gaze point depth information is consistent with the at least one piece of depth information, to determine whether the biometric authentication succeeds.

In another example embodiment, the program 1532 may be specifically used to enable the biometric authentication apparatus 1500 to perform the following steps:

obtaining, in response to an access request, verification information for biometric authentication and at least one piece of depth information corresponding to at least one presentation depth of the verification information;

providing to a second device with the verification information and the at least one piece of depth information;

acquiring, from the second device, gaze point depth information of at least one eye of a user during presentation of the verification information; and analyzing whether the gaze point depth information is consistent with the at least one piece of depth information, to determine whether the biometric authentication succeeds.

In still another example embodiment, the program 1532 may be specifically used to enable the biometric authentication apparatus 1500 to perform the following steps:

acquiring, from a first device, verification information for biometric authentication and at least one piece of depth information corresponding to at least one presentation depth of the verification information;

presenting the verification information at the at least one presentation depth according to the at least one piece of depth information;

acquiring gaze point depth information of at least one eye of a user during presentation of the verification information; and providing to the first device with the gaze point depth information.

Reference can be made to the corresponding description of the corresponding steps and units in the foregoing embodiments for specific implementation of the steps in the program 1532, which is not repeated herein. Those skilled in the art can clearly understand that, for the purpose of convenient and brief description, for detailed working processes of the foregoing devices and modules, reference can be made to the corresponding processes in the foregoing method embodiments, and details are not repeated herein.

A person of ordinary skill in the art may be aware that, in combination with the examples described in the embodiments disclosed in this specification, units and method steps may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of this application.

When the functions are implemented in a form of a software functional module and sold or used as an independent product, the functions may be stored in a computer-readable storage medium. Based on such an understanding, the technical solutions of this application essentially, or the part contributing to the prior art, or a part of the technical solutions may be implemented in a form of a software product. The computer software product is stored in a storage medium and includes several instructions for instructing a computer device (which may be a personal computer, a server, a network device, or the like) to perform all or a part of the steps of the methods described in the embodiments of this application. The foregoing storage medium comprises: a USB flash drive, a removable hard disk, a read-only memory (ROM), a random access memory (RAM), a magnetic disk, an optical disc or any other medium that can be configured to store program code.

The above implementations are only intended to describe this application rather than to limit this application. Various changes and variations can be made by those of ordinary skill in the art without departing from the spirit and scope of this application. Therefore, all equivalent technical solutions also belong to the category of this application, and the scope of patent protection of this application should be defined by the claims.

What is claimed is:

1. A method, comprising:
obtaining, by a system comprising a processor in response to an access request, verification information for biometric authentication and at least one piece of depth information corresponding to at least one presentation depth of the verification information;
presenting, by the system via a display device, the verification information at the at least one presentation depth according to the at least one piece of depth information;
tracking, by the system via a near-eye device, gazing directions of at least one eye of a user during the presentation of the verification information;
determining, by the system at least based on the gazing directions, gaze point depth information of the at least one eye of the user during the presentation of the verification information; and
analyzing, by the system, whether the gaze point depth information is consistent with the at least one piece of depth information, to determine whether the biometric authentication succeeds.

2. The method of claim 1, wherein the verification information comprises image elements, and the at least one piece of depth information comprises pieces of depth information corresponding to presentation depths; and
in the image elements, at least one image element and other image element respectively correspond to different depth information in the pieces of depth information.

3. The method of claim 1, wherein the obtaining the at least one piece of depth information comprises:
determining the at least one piece of depth information according to a set policy.

4. The method of claim 3, wherein the determining the at least one piece of depth information according to the set policy comprises:
randomly determining the at least one piece of depth information within a set range.

5. The method of claim 2, wherein the presenting the verification information at the at least one presentation depth according to the at least one piece of depth information comprises:
 presenting the image elements at the corresponding presentation depths according to the pieces of depth information.

6. The method of claim 5, wherein the presenting the image elements at the corresponding presentation depths comprises:
 presenting the image elements at the corresponding presentation depths in a set time sequence.

7. The method of claim 6, wherein the presenting the image elements at the corresponding presentation depths in the set time sequence comprises:
 presenting the image elements at the corresponding presentation depths in the set time sequence and at a random time interval.

8. The method of claim 1, wherein the verification information is presented through near-eye presentation.

9. The method of claim 2, wherein the determining the gaze point depth information of the at least one eye of the user during presentation of the verification information comprises:
 determining the gaze point depth information of the at least one eye of the user during presentation of the image elements.

10. The method of claim 1, wherein the determining the gaze point depth information comprises:
 determining gaze point depth information of two eyes of the at least one eye of the user by tracking the gazing directions of the two eyes of the user.

11. The method of claim 9, wherein the analyzing whether the gaze point depth information is consistent with the at least one piece of depth information comprises:
 analyzing whether the gaze point depth information is consistent with the pieces of depth information.

12. A method, comprising:
 obtaining, by a system comprising a processor in response to an access request, verification information for biometric authentication and at least one piece of depth information corresponding to at least one presentation depth of the verification information;
 transmitting, by the system to a second device, a communication comprising the verification information and the at least one piece of depth information that initiates the second device to:
  presenting the verification information at the at least one presentation depth according to the at least one piece of depth information,
  tracking gazing directions of at least one eye of a user during the presentation of the verification information, and
  generating, at least based on the gazing directions, gaze point depth information of the at least one eye of the user during the presentation of the verification information;
 acquiring, by the system from the second device, the gaze point depth information of the at least one eye of the user during the presentation of the verification information; and
 analyzing, by the system, whether the gaze point depth information is consistent with the at least one piece of depth information, to determine whether the biometric authentication has succeeded.

13. The method of claim 12, wherein
 the verification information comprises image elements, and the at least one piece of depth information is pieces of depth information corresponding to presentation depths; and
 in the image elements, at least one image element and at least one other image element respectively correspond to different depth information in the pieces of depth information.

14. The method of claim 12, wherein the obtaining the at least one piece of depth information comprises:
 determining the at least one piece of depth information according to a set policy.

15. The method of claim 14, wherein the determining the at least one piece of depth information according to the set policy comprises:
 randomly determining the at least one piece of depth information within a set range.

16. The method of claim 13, wherein the analyzing whether the gaze point depth information is consistent with the at least one piece of depth information comprises:
 analyzing whether the gaze point depth information is consistent with the pieces of depth information.

17. A method, comprising:
 acquiring, by a system comprising a processor from a first device, verification information for biometric authentication and a piece of depth information corresponding to a presentation depth of the verification information;
 presenting, by the system via a display device, the verification information at the presentation depth according to the piece of depth information;
 tracking, by the system via a near-eye device, gazing directions of at least one eye of a user during the presentation of the verification information;
 determining, by the system at least based on the gazing directions, gaze point depth information of the at least one eye of the user during the presentation of the verification information; and
 providing, by the system to the first device the gaze point depth information.

18. The method of claim 17, wherein
 the verification information comprises image elements, and the piece of depth information is pieces of depth information corresponding to presentation depths; and
 in the image elements, an image element and another image element respectively correspond to different depth information in the pieces of depth information.

19. The method of claim 18, wherein the presenting the verification information at the presentation depth according to the piece of depth information comprises:
 presenting the image elements at the corresponding presentation depths according to the pieces of depth information.

20. The method of claim 19, wherein the presenting the image elements at the corresponding presentation depths comprises:
 presenting the image elements at the corresponding presentation depths in a set time sequence.

21. The method of claim 20, wherein the presenting the image elements at the corresponding presentation depths in the set time sequence comprises:
 presenting the image elements at the corresponding presentation depths in the set time sequence and at a random time interval.

22. The method of claim 17, wherein the verification information is presented through near-eye presentation.

23. The method of claim 18, wherein the determining the gaze point depth information of the eye of the user during presentation of the verification information comprises:
   determining the gaze point depth information of the eye of the user during presentation of the image elements.

24. The method of claim 17, wherein the determining the gaze point depth information comprises:
   determining gaze point depth information of two eyes of the at least one eye of the user by tracking the gazing directions of the two eyes.

25. An apparatus, comprising:
   a memory that stores executable modules; and
   a processor, coupled to the memory, that executes or facilitates execution of the executable modules, comprising:
      a first information acquisition module configured to obtain, in response to an access request, verification information for biometric authentication and a piece of depth information corresponding to a presentation depth of the verification information;
      a presentation module configured to present via a display device the verification information at the presentation depth according to the piece of depth information;
      a second information acquisition module configured to:
         track, via a near-eye device, gazing directions of at least one eye of a user during the presentation of the verification information;
         determine, at least based on the gazing directions, gaze point depth information of the at least one eye of the user during the presentation of the verification information; and
      an analysis module configured to analyze whether the gaze point depth information is consistent with the piece of depth information, to determine whether the biometric authentication has succeeded.

26. The apparatus of claim 25, wherein the first information acquisition module is further configured to:
   obtain the verification information comprising a plurality of image elements and a plurality of pieces of depth information corresponding to a plurality of presentation depths, wherein
   in the plurality of image elements, an image element and another image element respectively correspond to different depth information in the plurality of pieces of depth information.

27. The apparatus of claim 25, wherein the first information acquisition module comprises:
   a depth information determination unit configured to determine the piece of depth information according to a set policy.

28. The apparatus of claim 27, wherein the depth information determination unit is further configured to:
   randomly determine the piece of depth information within a set range.

29. The apparatus of claim 26, wherein the presentation module is further configured to:
   present the plurality of image elements at the plurality of corresponding presentation depths according to the plurality of pieces of depth information.

30. The apparatus of claim 29, wherein the presentation module is further configured to:
   present the plurality of image elements at the plurality of corresponding presentation depths in a set time sequence.

31. The apparatus of claim 30, wherein the presentation module is further configured to:
   present the plurality of image elements at the plurality of corresponding presentation depths in the set time sequence and at a random time interval.

32. The apparatus of claim 25, wherein the presentation module comprises a near-eye presentation unit as the display device, configured to present the verification information through near-eye presentation.

33. The apparatus of claim 26, wherein the second information acquisition module is further configured to:
   determine the gaze point depth information of the at least one eye of the user during the presentation of the plurality of image elements.

34. The apparatus of claim 25, wherein the second information acquisition module comprises:
   a gaze tracking unit configured to determine gaze point depth information of two eyes that least one eye of the user by tracking the gazing directions of the two eyes.

35. The apparatus of claim 33, wherein the analysis module is further configured to:
   analyze whether the gaze point depth information is consistent with the plurality of pieces of depth information.

36. A near-eye wearable device, comprising the biometric authentication apparatus of claim 25.

37. An apparatus, comprising:
   a memory that stores executable modules; and
   a processor, coupled to the memory, that executes or facilitates execution of the executable modules, comprising:
      a first information acquisition module configured to obtain, in response to an access request, verification information for biometric authentication and at least one piece of depth information corresponding to at least one presentation depth of the verification information;
      a communications module configured to transmit to a second device a communication comprising the verification information and the at least one piece of depth information that initiates the second device to:
         present the verification information at the at least one presentation depth according to the at least one piece of depth information,
         track gazing directions of at least one eye of a user during presentation of the verification information, and
         generate, at least based on the gazing directions, gaze point depth information of the at least one eye of the user during the presentation of the verification information;
      the communications module is further configured to acquire, from the second device, the gaze point depth information of the at least one eye of the user during the presentation of the verification information; and
      an analysis module configured to analyze whether the gaze point depth information is consistent with the at least one piece of depth information, to determine whether the biometric authentication succeeds.

38. The apparatus of claim 37, wherein the first information acquisition module is further configured to:
   obtain the verification information comprising image elements and pieces of depth information corresponding to presentation depths, wherein
   in the image elements, at least one image element and at least one other image element respectively correspond to different depth information in the pieces of depth information.

39. The apparatus of claim 37, wherein the first information acquisition module comprises:
  a depth information determination unit configured to determine the at least one piece of depth information according to a set policy.

40. The apparatus of claim 39, wherein the depth information determination unit is further configured to:
  randomly determine the at least one piece of depth information within a set range.

41. The apparatus of claim 38, wherein the analysis module is further configured to:
  analyze whether the gaze point depth information is consistent with the pieces of depth information.

42. An apparatus, comprising:
  a memory that stores executable modules; and
  a processor, coupled to the memory, that executes or facilitates execution of the executable modules, comprising:
    a communications module configured to acquire, from a first device, verification information for biometric authentication and at least one piece of depth information corresponding to at least one presentation depth of the verification information;
    a presentation module configured to present, via a display device, the verification information at the at least one presentation depth according to the at least one piece of depth information; and
    a second information acquisition module configured to:
      track, via a near-eye device, gazing directions of at least one eye of a user during the presentation of the verification information, and
      determine, at least based on the gazing directions, gaze point depth information of the at least one eye of the user during the presentation of the verification information; and
    the communications module is further configured to provide to the first device with the gaze point depth information.

43. The apparatus of claim 42, wherein the communications module is further configured to acquire, from the first device, the verification information comprising image elements and pieces of depth information corresponding to presentation depths, wherein
  in the image elements, at least one image element and at least one other image element respectively correspond to different depth information in the pieces of depth information.

44. The apparatus of claim 43, wherein the presentation module is further configured to:
  present the image elements at the corresponding presentation depths according to the pieces of depth information.

45. The apparatus of claim 44, wherein the presentation module is further configured to:
  present the image elements at the corresponding presentation depths in a set time sequence.

46. The apparatus of claim 45, wherein the presentation module is further configured to:
  present the image elements at the corresponding presentation depths in the set time sequence and at a random time interval.

47. The apparatus of claim 42, wherein the presentation module comprises a near-eye presentation unit as the display device, configured to present the verification information through near-eye presentation.

48. The apparatus of claim 43, wherein the second information acquisition module is further configured to:
  determine the gaze point depth information of the at least one eye of the user during presentation of the image elements.

49. The apparatus of claim 42, wherein the second information acquisition module comprises:
  a gaze tracking unit configured to determine gaze point depth information of two eyes the at least one eye of the user by tracking the gazing directions of the two eyes of the user.

50. A near-eye wearable device, comprising the biometric authentication apparatus of claim 42.

51. A non-transitory computer readable medium storage device comprising executable instructions that, in response to execution, cause a device comprising a processor to perform operations, comprising:
  obtaining, in response to an access request, verification information for biometric authentication and at least one piece of depth information corresponding to at least one presentation depth of the verification information;
  presenting, via a display device, the verification information at the at least one presentation depth according to the at least one piece of depth information;
  tracking, via a near-eye device, gazing directions of at least one eye of a user during presentation of the verification information;
  determining, at least based on the gazing directions, gaze point depth information of the at least one eye of the user during the during presentation of the verification information; and
  analyzing whether the gaze point depth information is consistent with the at least one piece of depth information, to determine whether the biometric authentication succeeds.

52. A non-transitory computer readable medium comprising executable instructions that, in response to execution, cause a device comprising a processor to perform operations, comprising:
  obtaining, in response to an access request, verification information for biometric authentication and at least one piece of depth information corresponding to at least one presentation depth of the verification information;
  transmitting, to a second device, a communication comprising the verification information and the at least one piece of depth information that initiates the second device to:
    presenting the verification information at the at least one presentation depth according to the at least one piece of depth information,
    tracking gazing directions of at least one eye of a user during the presentation of the verification information, and
    generating, at least based on the gazing directions, gaze point depth information of the at least one eye of the user during the presentation of the verification information;
  acquiring, from the second device, the gaze point depth information of the at least one eye of the user during the presentation of the verification information; and
  analyzing whether the gaze point depth information is consistent with the at least one piece of depth information, to determine whether the biometric authentication succeeds.

53. A non-transitory computer readable medium comprising executable instructions that, in response to execution, cause a device comprising a processor to perform operations, comprising:

acquiring, from a first device, verification information for biometric authentication and at least one piece of depth information corresponding to at least one presentation depth of the verification information;

presenting, via a display device, the verification information at the at least one presentation depth according to the at least one piece of depth information;

tracking, via a near-eye device, gazing directions of at least one eye of a user during the presentation of the verification information;

determining, at least based on the gazing directions, gaze point depth information of at least one eye of a user during presentation of the verification information; and providing to the first device the gaze point depth information.

* * * * *